(12) United States Patent
Lim

(10) Patent No.: US 6,975,367 B2
(45) Date of Patent: Dec. 13, 2005

(54) LIQUID CRYSTAL DISPLAY PANEL AND METHOD OF FABRICATING THE SAME

(75) Inventor: Byoung Ho Lim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 44 days.

(21) Appl. No.: 10/669,378

(22) Filed: Sep. 25, 2003

(65) Prior Publication Data

US 2004/0066472 A1    Apr. 8, 2004

(30) Foreign Application Priority Data

Oct. 5, 2002 (KR) ................. 10-2002-0060784

(51) Int. Cl.[7] ............................................. G02F 1/1368
(52) U.S. Cl. ......................... 349/43; 349/111; 349/187
(58) Field of Search ........................ 349/43, 44, 110, 349/111, 122, 138, 187; 257/59, 72; 438/30

(56) References Cited

U.S. PATENT DOCUMENTS

| | | | | |
|---|---|---|---|---|
| 5,847,781 A | * | 12/1998 | Ono et al. ................... | 349/44 |
| 6,038,002 A | * | 3/2000 | Song .......................... | 349/43 |
| 6,563,482 B1 | * | 5/2003 | Yamazaki et al. ........... | 345/87 |

* cited by examiner

*Primary Examiner*—Dung T. Nguyen
*Assistant Examiner*—Tai Duong
(74) *Attorney, Agent, or Firm*—Morgan, Lewis & Bockius LLP

(57) ABSTRACT

A liquid crystal display panel includes a plurality of gate lines and data lines formed on a substrate, a plurality of pixel electrodes receiving data signals having different polarities from each other, a semiconductor layer formed along a direction of each of the data lines at a lower part of the data lines, and a plurality of light-shielding patterns formed along the direction of the data lines, wherein each of the light-shielding patterns overlap opposing edges of the data line and the semiconductor layer.

14 Claims, 17 Drawing Sheets

LIGHT

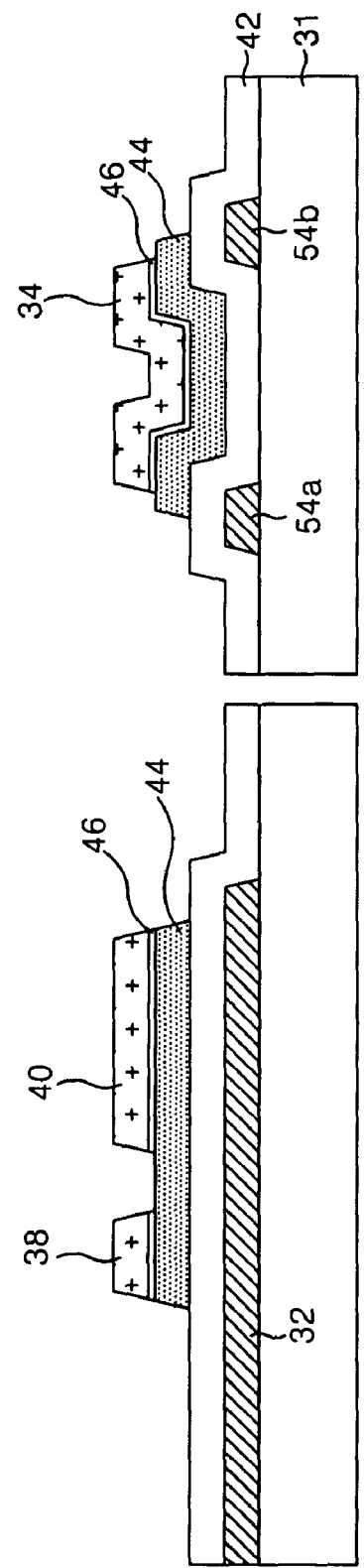
FIG.10A
FIG.10B

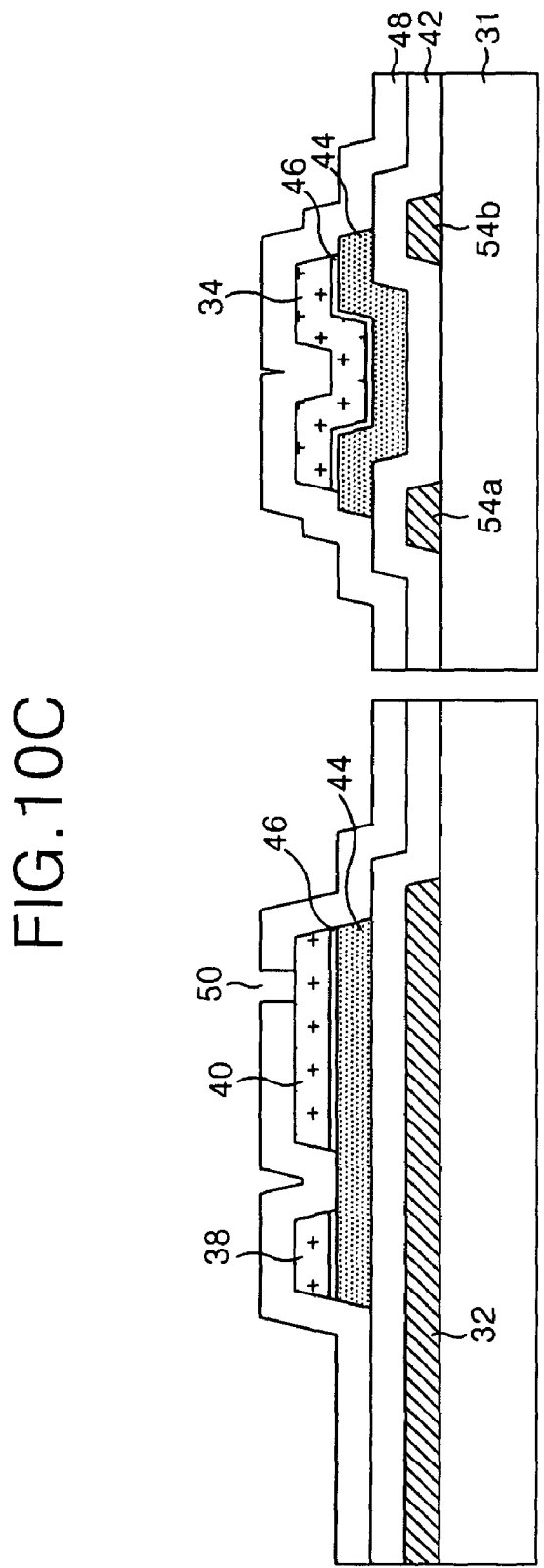

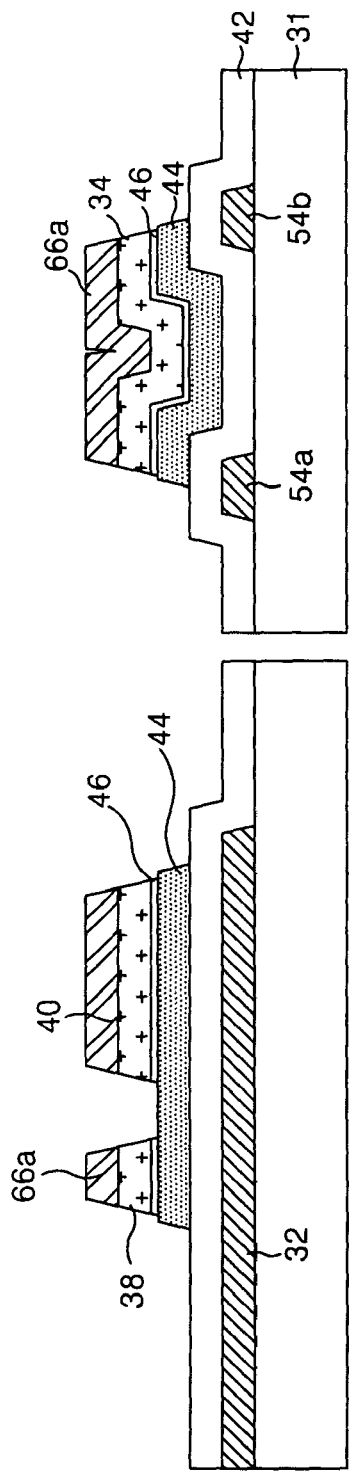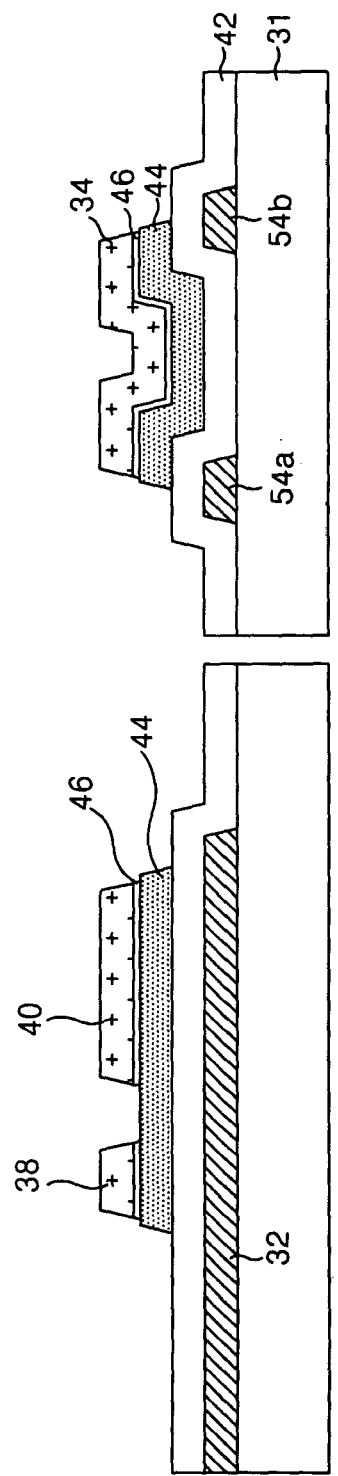

LIQUID CRYSTAL DISPLAY PANEL AND METHOD OF FABRICATING THE SAME

The present invention claims the benefit of the Korean Patent Application No. 2002-60784 filed on Oct. 5, 2002, which is hereby incorporated by reference.

BACKGROUND OF THE INVENTION

1. Field of the Invention

The present invention relates to a display panel and a method of fabricating a display panel, and more particularly, to a liquid crystal display panel and a method of fabricating a liquid crystal display panel.

2. Description of the Related Art

In general, a liquid crystal display device operates by controlling light transmittance through liquid crystals of a liquid crystal material layer using an applied electric field to orient the liquid crystals in order to display an image (i.e., a picture). Accordingly, the liquid crystal display includes a liquid crystal display panel having liquid crystal cells arranged in a matrix configuration, and a drive circuit to drive the liquid crystal display panel.

In addition, pixel and common electrodes are provided to supply the applied electric field to each of the liquid crystal cells. For example, the pixel electrodes are formed on a lower substrate of the liquid crystal cells, and the common electrode is formed across an entire surface of an upper substrate. Each pixel electrode is connected to a thin film transistor (TFT), which functions as a switching device, to drive the liquid crystal cell together with the common electrode according to data signals supplied through the TFT.

Since fabrication of the lower substrate requires a plurality of mask and semiconductor processes, production of the lower substrate becomes complicated and is considered a major factor in increases in fabrication costs of the liquid crystal display panel. Accordingly, fabrication processes have been developed to reduce the total number of mask processes required to produce the lower substrate. For example, one single mask process has been developed that includes several processing sequence steps, such as deposition, cleaning, photolithography, etching, exfoliation, and testing. Accordingly, a five-mask fabrication process sequence may be reduced to a four-mask fabrication process.

FIG. 1 is a plan view of a lower array substrate of a liquid crystal display according to the related art, and FIG. 2 is a cross sectional view along II–II' of FIG. 1 according to the related art. In FIGS. 1 and 2, a lower substrate 1 of a liquid crystal display includes a TFT 30 located at each intersection part of data lines 4 and gate lines 2, and a pixel electrode 22 connected to a drain electrode 10 of the TFT 30. The TFT 30 includes a gate electrode 6 connected to the gate line 2, a source electrode 8 connected to the data line 4, and a drain electrode 10 connected to the pixel electrode 22 through a drain contact hole 20. The gate electrode 6 partially overlaps the data line 4, wherein an uppermost side of the overlapping area with the data line is formed to have an inclined surface. The drain electrode 10 has a neck part 10A where the drain electrode 10 overlaps the gate electrode 6, and a head part 10B where the drain electrode 10 overlaps the pixel electrode 22. The source electrode 8 projects from two areas of the data line 4 to face both sides of the neck part 10A of the drain electrode 10 with a C-shaped channel therebetween.

In addition, the TFT 30 includes semiconductor layers 14 and 16 that form a conductive channel between the source electrode 8 and the drain electrode 10 by application of a gate signal to the gate electrode 6. Accordingly, the TFT 30 selectively supplies a data signal from the data line 4 to the pixel electrode 22 in response to the gate signal received from the gate line 2.

The pixel electrode 22 is located at a cell area divided by the data line 4 and the gate line 2 and is formed of a transparent conductive material having a high light transmittance. The pixel electrode 22 is formed on a protective layer 18 provided on an entire surface of the lower substrate 1, and is electrically connected to the drain electrode 10 through a drain contact hole 20 formed in the protective layer 18. Accordingly, a potential difference is generated between the pixel electrode 22 and a common transparent electrode (not shown) formed in an upper substrate (not shown) by the data signal supplied through the TFT 30. The potential difference causes rotation of the liquid crystals located between the lower substrate 1 and the upper substrate (not shown) due to dielectric constant anisotropy of the liquid crystals. The rotating liquid crystals cause a light incident through the pixel electrode 22 from a light source to be transmitted toward an upper substrate.

FIGS. 3A to 3D are cross sectional views of a method of fabricating the lower array substrate of FIG. 2. In FIG. 3A, the gate electrode 6 and the gate line 2 are formed on the lower substrate 1 by depositing a gate metal layer, such as aluminum or an aluminum alloy, on the lower substrate 1 by a deposition method, such as sputtering. Then, the gate metal layer is patterned by photolithographic and etching processes using a first mask to form the gate electrode 6 and the gate line 2 on the lower substrate 1.

In FIG. 3B, a gate insulating film 12, an active layer 14, an ohmic contact layer 16, a data line (not shown), a source electrode 8, and a drain electrode 10 are formed on the lower substrate provided with the gate electrode 6 and the gate line 2. For example, the gate insulating film 12, first and second semiconductor layers, and a data metal layer are sequentially deposited on the lower substrate 1 using a deposition method, such as chemical vapor deposition or sputtering. The gate insulating film 12 is formed of an inorganic insulating material, such as silicon oxide SiOx or silicon nitride SiNx, a first semiconductor layer is formed of undoped amorphous silicon, a second semiconductor layer is formed of n-doped or p-doped amorphous silicon, and the data metal layer is formed of molybdenum Mo or an molybdenum alloy.

Then, a photo resist pattern is formed on the data metal layer using photolithographic processes using a second mask. For example, a halftone mask with a semi-transmitting part corresponding to a channel part of the TFT is used as the second mask. Accordingly, the photo resist pattern corresponding to the channel part is lower in height than the photo resist pattern corresponding to source and drain electrodes of the TFT. The data metal layer is patterned using a wet etching process using the photo resist pattern, whereby the data line 4, the source electrode 8, and the drain electrode 10 are formed.

Next, the first and second semiconductors are simultaneously patterned using a dry etching process using the photo resist pattern to form an active layer 14 and an ohmic contact layer 16. Then, a portion of the photo resist pattern corresponding to the channel part of the TFT is removed using an ashing process, and the data metal layer and the ohmic contact layer formed at the channel part are etched using the dry etching process using remaining portions of the photo resist pattern. Accordingly, the active layer 14 of the channel part is exposed, thereby separating the source electrode 8 from the drain electrode 10. Then, the remaining portions of the photo resist pattern are removed from the source electrode 8 and the drain electrode 10 using a stripping process.

In FIG. 3C, a protective film 18 having a drain contact hole 20 is formed on the gate insulating film 12 where the source electrode 8, the drain electrode 10, and the data line are formed. For example, an insulating material is deposited on the gate insulating film 12 provided with the source electrode 8, the drain electrode 10, and the data line, thereby forming the protective film 18. The protective film 18 is formed of an inorganic insulating material, such as silicon nitride SiNx and silicon oxide SiOx, or an organic insulating material, such as acrylic organic compound, benzocyclobutene BCB, and perfluorocyclobutane PFCB. Then, the protective film 18 is patterned using the photolithographic and etching processes using a third mask to form the drain contact hole 20. The drain contact hole 20 is formed to penetrate through the protective film 18 to expose the drain electrode 10.

In FIG. 3D, the pixel electrode 22 is formed on the protective film 18. For example, a transparent metal layer is formed on the lower substrate 1 by a deposition method, such as sputtering. The transparent metal layer is formed of indium-tin-oxide ITO, indium-zinc-oxide IZO, or indium-tin-zinc-oxide ITZO. Then, the transparent metal layer is patterned using the photolithographic and etching processes using a fourth mask to form the pixel electrode 22. The pixel electrode 22 is connected to the drain electrode 10 through the drain contact hole 20 in the protective film 18.

Accordingly, the data metal layer and the semiconductor layer are patterned using the same mask to form the active layer 14, the ohmic contact layer 16, the data line 4, the source electrode 8, and the drain electrode 10. In addition, the semiconductor layer is formed to be relatively wider than the data metal layer, wherein the active layer 14 located at a lower part of the data line 4 is formed to be wider than that of the data line 4, and the active layer 14 located at a lower part of the source electrode 8 and the drain electrode 10 is formed to be wider than these.

FIGS. 4A and 4B are cross sectional views along IV–IV' of FIG. 1 according to the related art. In FIG. 4A, when the active layer 14 becomes conductive, a first capacitance Cdp2 is generated between the active layer 14 and the pixel electrode 22. In FIG. 4B, when the active layer 14 becomes non-conductive, a second capacitance Cdp1 is generated between the data line 4 and the pixel electrode 22. Accordingly, deterioration of picture quality occurs such that wave-shaped images are display on a display screen due to the difference between the first capacitance Cdp2 between the active layer 14 and the pixel electrode 22, which is generated by ON/OFF operation of a backlight device, and the second capacitance Cdp1 between the data line 4 and the pixel electrode 22.

FIG. 5 is a plan view of a lower array substrate of a liquid crystal display panel according to the related art, and FIG. 6 is a cross sectional view along IV–IV' of FIG. 5 according to the related art. In FIGS. 5 and 6, a light-shielding pattern 24 of a liquid crystal display is formed of a gate metal layer formed on the substrate 1 to be relatively wider than an active layer 14 formed at a lower part of a data line 4. Accordingly, since the light shielding pattern 24 has a wider width than a width of the active layer 14, conductivity changes in the active layer 14 may be prevented due to the operation of the backlight. Furthermore, the capacitances C1 and C2 formed between the light-shielding pattern 24 and the pixel electrode 22 become equal, irrespective of the operational status of the backlight. Thus, deterioration of picture quality can be prevented.

However, charged voltage leakage in the pixel electrode when driving the liquid crystal display panel by a dot inversion system is problematic. For example, since first and second pixel electrodes 22' and 22 are formed with the data line 4 therebetween, if a positive pixel voltage is charged in the first pixel electrode 22' and a negative pixel voltage is charged in the second pixel electrode 22. The positive pixel voltage charged in the first pixel electrode 22' through the light-shielding pattern, which forms the capacitances C1 and C2 with the first and second pixel electrodes 22' and 22, respectively, leaks out to the second pixel electrode 22 through the first and second capacitances C1 and C2 and a resistance R of the light shielding pattern 24. Accordingly, the picture quality deteriorates.

SUMMARY OF THE INVENTION

Accordingly, the present invention is directed to a liquid crystal display panel and method of fabricating a liquid crystal display panel that substantially obviates one or more of the problems due to limitations and disadvantages of the related art.

An object of the present invention to provide a liquid crystal display panel that is adaptive for providing improving picture quality.

An object of the present invention to provide a method of fabricating a liquid crystal display panel that is adaptive for providing improving picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes a plurality of gate lines and data lines formed on a substrate, a plurality of pixel electrodes receiving data signals having different polarities from each other, a semiconductor layer formed along a direction of each of the data lines at a lower part of the data lines, and a plurality of light-shielding patterns formed along the direction of the data lines, wherein each of the light-shielding patterns overlap opposing edges of the data line and the semiconductor layer.

In another aspect, a method of fabricating a liquid crystal display panel includes forming a gate electrode, a gate line, and individual first and second light-shielding patterns on a substrate, forming a gate insulating film on the substrate to cover the gate electrode, the gate line, and the individual first and second light-shielding patterns, forming a semiconductor layer on the gate insulating film to partially overlap the individual first and second light-shielding patterns, forming a data line on the gate insulating film to partially overlap the individual first and second light-shielding patterns and the semiconductor layer, a source electrode that is connected to the data line, and a drain electrode that faces the source electrode with the semiconductor layer therebetween, forming a protective film having a contact hole that exposes a portion of the drain electrode, and forming a plurality of pixel electrodes on the protective film, wherein adjacent ones of the pixel electrodes receive pixel voltages having different polarities.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 10A to 10D are cross sectional views of FIG. 8 showing an exemplary method of fabricating a lower array substrate of a liquid crystal display panel according to the present invention; and FIGS. 11A to 11E are cross sectional views of an exemplary second mask process of FIG. 10B according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 7:
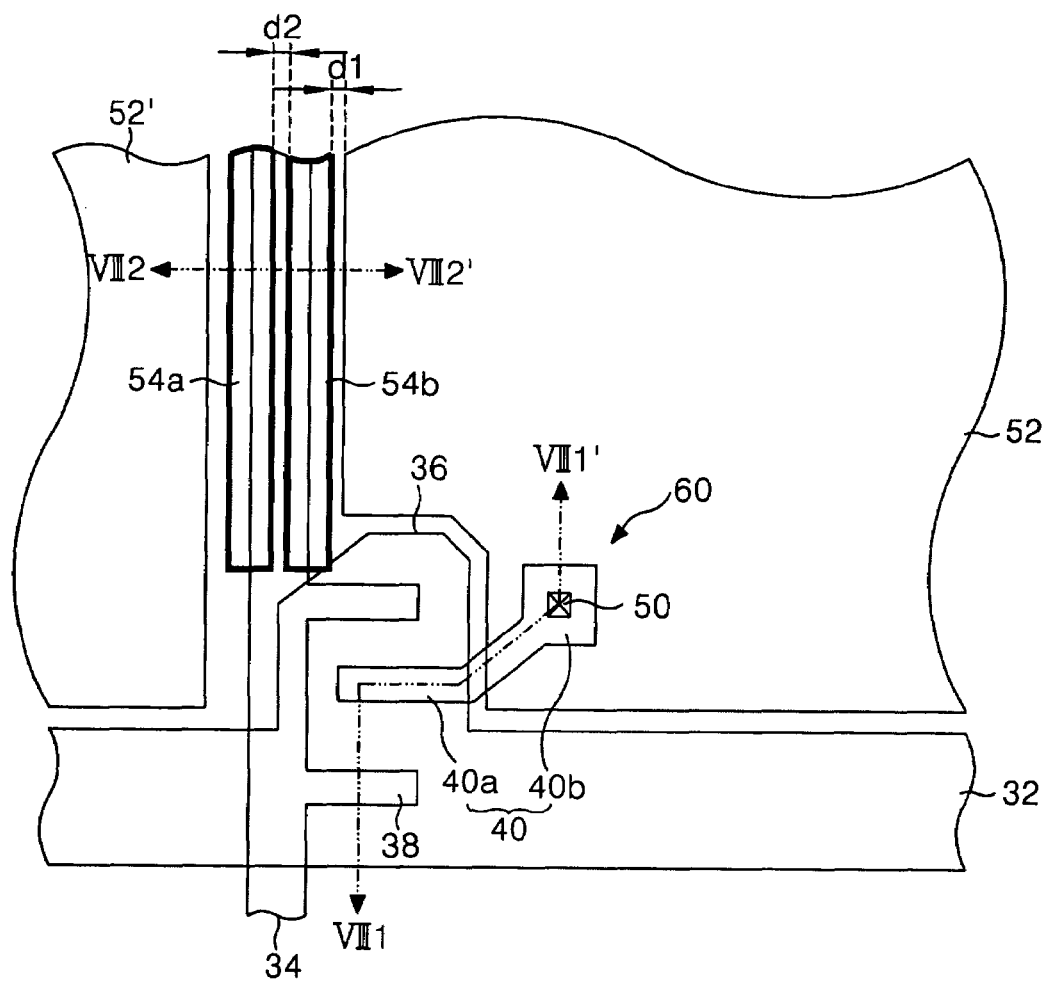
FIG. 7 is a plan view of an exemplary lower array substrate of a liquid crystal display panel according to the present invention.
Figure 8:
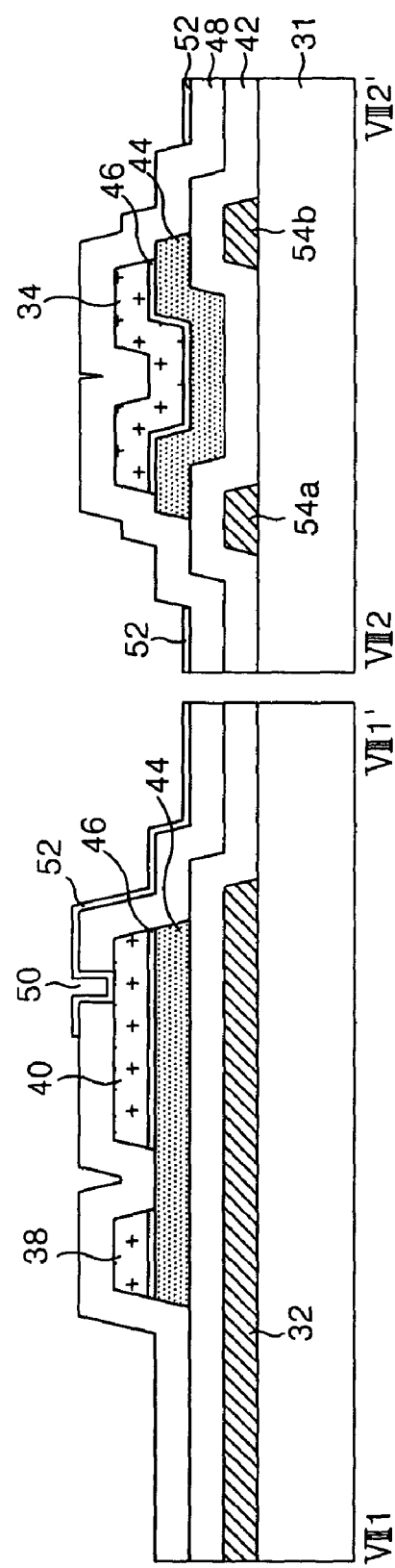
FIG. 8 are cross sectional views along VIII1–VIII1' and VIII2–VIII2' of FIG. 7 according to the present invention.

FIG. 7 is a plan view of an exemplary lower array substrate of a liquid crystal display panel according to the present invention, and FIG. 8 are cross sectional views along VIII1–VIII1' and VIII2–VIII2' of FIG. 7 according to the present invention. In FIGS. 7 and 8, a lower array substrate of a liquid crystal display may include a TFT 60 located at each intersection part of data lines 34 and gate lines 32, and a pixel electrode 52 connected to a drain electrode 40 of a TFT 60. The TFT 60 may include a gate electrode 36 connected to the gate line 32 and a source electrode 38 connected to the data line 34.

The gate electrode 36 may be formed to contact the gate line 32 and to partially overlap the data line 34, wherein an upper part of an area where the gate electrode 36 overlaps the data line 34 may be formed having an inclined surface. The drain electrode 40 may have a neck part 40A where the drain electrode 40 overlaps the gate electrode 36, and a head part 40B where the drain electrode 40 overlaps the pixel electrode 52. The source electrode 38 may be formed to face the neck part 40A of the drain electrode 40 with a C-shaped channel therebetween, and may project from two areas of the data line 34.

In addition, the TFT 60 may include semiconductor layers 44 and 46 to form a channel between the source electrode 38 and the drain electrode 40 by application of a gate signal to the gate electrode 36. Accordingly, the TFT 60 may selectively supply a data signal transmitted along the data line 34 to the pixel electrode 52 in response to the gate signal supplied to the gate line 32.

The pixel electrode 52 may be located at a cell area divided by the data line 34 and the gate line 32, and may include transparent conductive material(s) with high light transmittance(s). The pixel electrode 52 may be formed on a protective layer 48 and may be electrically connected to the drain electrode 40. Accordingly, a potential difference may be generated between the pixel electrode 22 and a common transparent electrode (not shown) formed in an upper substrate (not shown) by a data signal transmitted through the TFT 60. The potential difference causes rotation of liquid crystals located between the lower substrate 31 and the upper substrate (not shown) due to dielectric constant anisotropy of the liquid crystals. Thus, rotation of the liquid crystals controls an amount of light transmitted toward the upper substrate through the pixel electrode 52 from a light source (not shown).

In FIGS. 7 and 8, first and second light-shielding patterns 54a and 54b may separately be formed to partially overlap opposing edges of the data line 34. The first and second light-shielding patterns 54a and 54b may be formed of the same material as a gate metal layer formed on the lower substrate 31 along the data line 34. The first and second light-shielding patterns 54a and 54b may include at least one of aluminum, aluminum-neodymium, and copper.

The first light-shielding pattern 54a may be formed to partially overlap a left edge of the data line 34, and the second light-shielding pattern 54b may be formed to partially overlap a right edge of the data line 34. Accordingly, the first and second light-shielding patterns 54a and 54b may be separated by a gap with first and second pixel electrodes 52' and 52 when the protective film includes inorganic insulating material(s). Conversely, the first and second light-shielding patterns 54a and 54b may be formed to partially overlap the first and second pixel electrodes 52' and 52, respectively, when the protective film includes organic insulating material(s).

Figure 9:
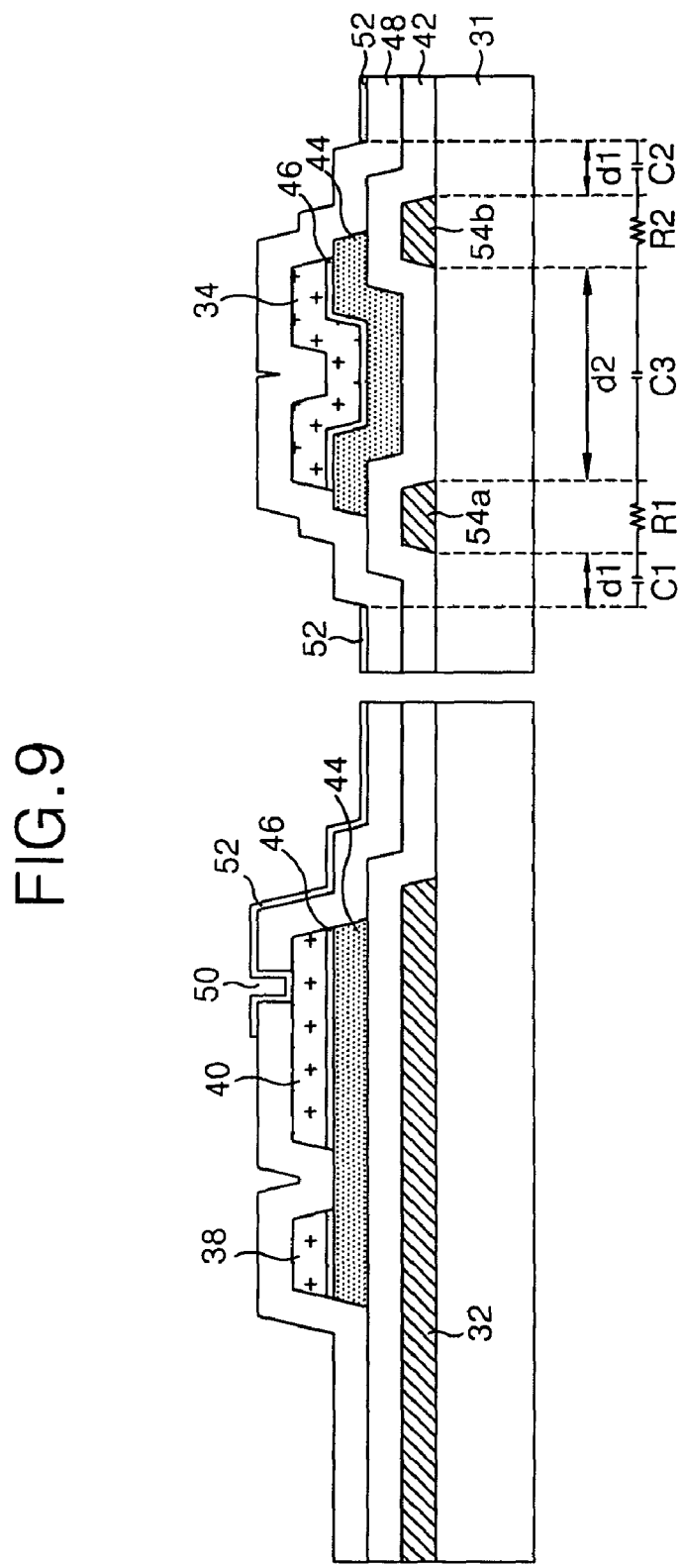
FIG. 9 are cross sectional views along VIII1–VIII1' and VIII2–VIII2' of FIG. 7 demonstrating capacitive relationships between a pixel electrode and each of first and second light-shielding patterns according to the present invention.

FIG. 9 are cross sectional views along VIII1–VIII1' and VIII2–VIII2' of FIG. 7 demonstrating capacitive relationships between a pixel electrode and each of first and second light-shielding patterns according to the present invention. In FIG. 9, the first and second light-shielding patterns 54a and 54b may be formed to maintain a floating state (i.e., no applied voltages) to be separated from each other at a lower part of the data line 34. Accordingly, a second distance D2 between the first and second shielding patterns 54a and 54b may be formed to be longer than a first distance D1 between the first and second pixel electrodes 52' and 52 and the first and second light-shielding patterns 54a and 54b. For example, if the first distance D1 may be about 1 μm, the second distance D2 may be at least about 4 μm.

The first capacitance C1 between the first light-shielding pattern 54a and the first pixel electrode 52' may be about the same as the second capacitance C2 between the second light-shielding pattern 54b and the second pixel electrode 52. However, a third capacitance C3 formed between the first light-shielding pattern 54a and the second light-shielding pattern 54b may be relatively lower than the first or second capacitance C1 or C2 since the distance between the first light-shielding pattern 54a and the second light-shielding pattern 54b may be longer than the distance between the pixel electrodes 52 corresponding to the first or second capacitances C1 and C2.

Accordingly, by driving the display panel using a dot inversion system, wherein a pixel voltage with an opposite polarity is charged in the adjacent pixel electrodes, the positive voltage charged in the first pixel electrode 52 does not affect a negative voltage charged in the second pixel electrode 52 since the third capacitance C3 may be relatively small. Furthermore, the first and second light-shielding patterns 54a and 54b may be formed to overlap opposing edges of the active layer 44 located at a lower part of the data line 34, thereby intercepting any light irradiated from a backlight (not shown). Accordingly, photoelectric current of the active layer 44 may be restrained from being generated in accordance with whether the backlight is ON or OFF.

Figure 10D:
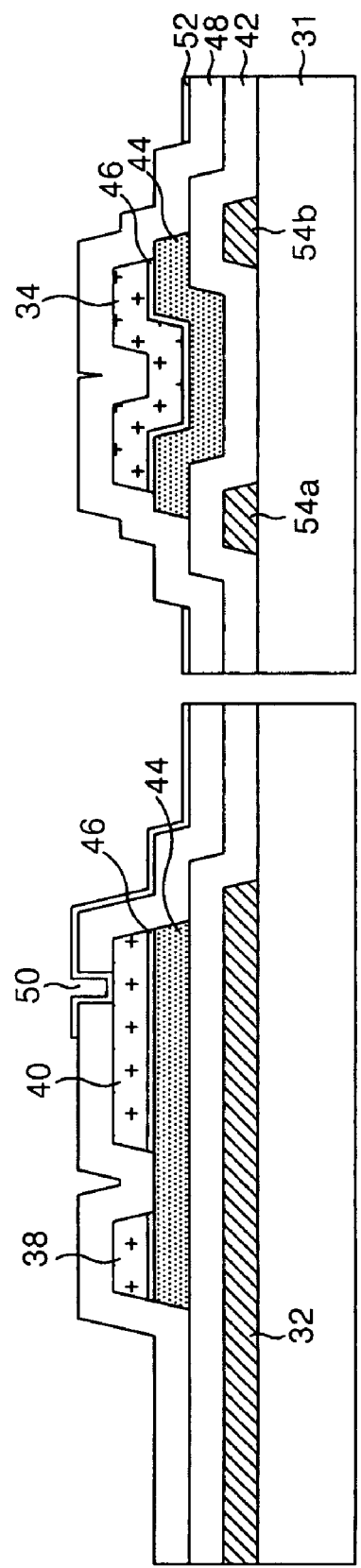

FIGS. 10A to 10D are cross sectional views of FIG. 8 showing an exemplary method of fabricating a lower array substrate of a liquid crystal display panel according to the present invention. In FIG. 10A, a gate electrode (not shown), a gate line 32, and first and second light-shielding patterns 54a and 54b may be formed on a lower substrate 31. For example, a gate metal layer may be deposited on the lower substrate 31 using a deposition method, such as sputtering, wherein the gate metal layer may have a single layer structure including aluminum Al or aluminum neodymium AlNd. Then, a first mask (not shown) may be aligned on the lower substrate 31, and the gate metal layer may be patterned using photolithographic processes, including exposure and development steps, and an etching process. Accordingly, a gate electrode 36, the gate line 32, and the light-shielding patterns 54a and 54b may be formed on the lower substrate 31.

In FIG. 10B, a gate insulating film 42, an active layer 44, an ohmic contact layer 46, a data line 34, a source electrode 38, and a drain electrode 40 may be formed on the lower substrate 31. For example, the gate insulating film 42, first and second semiconductor layers, and a data metal layer may be sequentially deposited on the lower substrate 31 using a deposition method, such as chemical vapor deposition or sputtering. The gate insulating film 42 may include inorganic insulating material(s), such as silicon oxide SiOx or silicon nitride SiNx, the first semiconductor layer may include undoped amorphous silicon, the second semiconductor layer may include n-doped or p-doped amorphous silicon, and the data metal layer may include molybdenum Mo or a molybdenum alloy.

Then, a second mask (not shown) may be aligned on the lower substrate 31, and the first and second semiconductors and the data metal layer may be patterned using photolithographic processes, including exposure and development, and an etching process. Accordingly, the active layer 44, the ohmic contact layer 46, the data line 34, and the source and drain electrodes 38 and 40 may be formed on the lower substrate 31.

In FIG. 10C, a protective film 48 having a drain contact hole 50 may be formed on the lower substrate 31. For example, the protective film 48 may be formed by depositing insulating material(s) on an entire surface of the lower substrate 31. The protective film 48 may include inorganic insulating material(s), such as silicon nitride SiNx and silicon oxide SiOx, or organic insulating material(s), such as acrylic organic compound, benzocyclobutene BCB, and perfluorocyclobutane PFCB. Then, the insulating material(s) may be patterned using photolithographic processes, including exposure and development, and an etching process using a third mask aligned on the lower substrate 31, thereby forming the drain contact hole 50 that penetrates through the protective film 48 to expose a portion of the drain electrode 40.

In FIG. 10D, a pixel electrode 52 may be formed on the lower substrate 31. For example, transparent conductive material(s) may be deposited on an entire surface of the protective film 48 using a deposition method, such as sputtering. The transparent conductive material(s) may include one of indium tin oxide ITO, indium zinc oxide IZO, or indium tin zinc oxide ITZO. Then, the transparent conductive material(s) may be patterned using photolithographic and etching processes using a fourth mask aligned on the lower substrate 31, thereby forming the pixel electrode 52.

Figure 1:
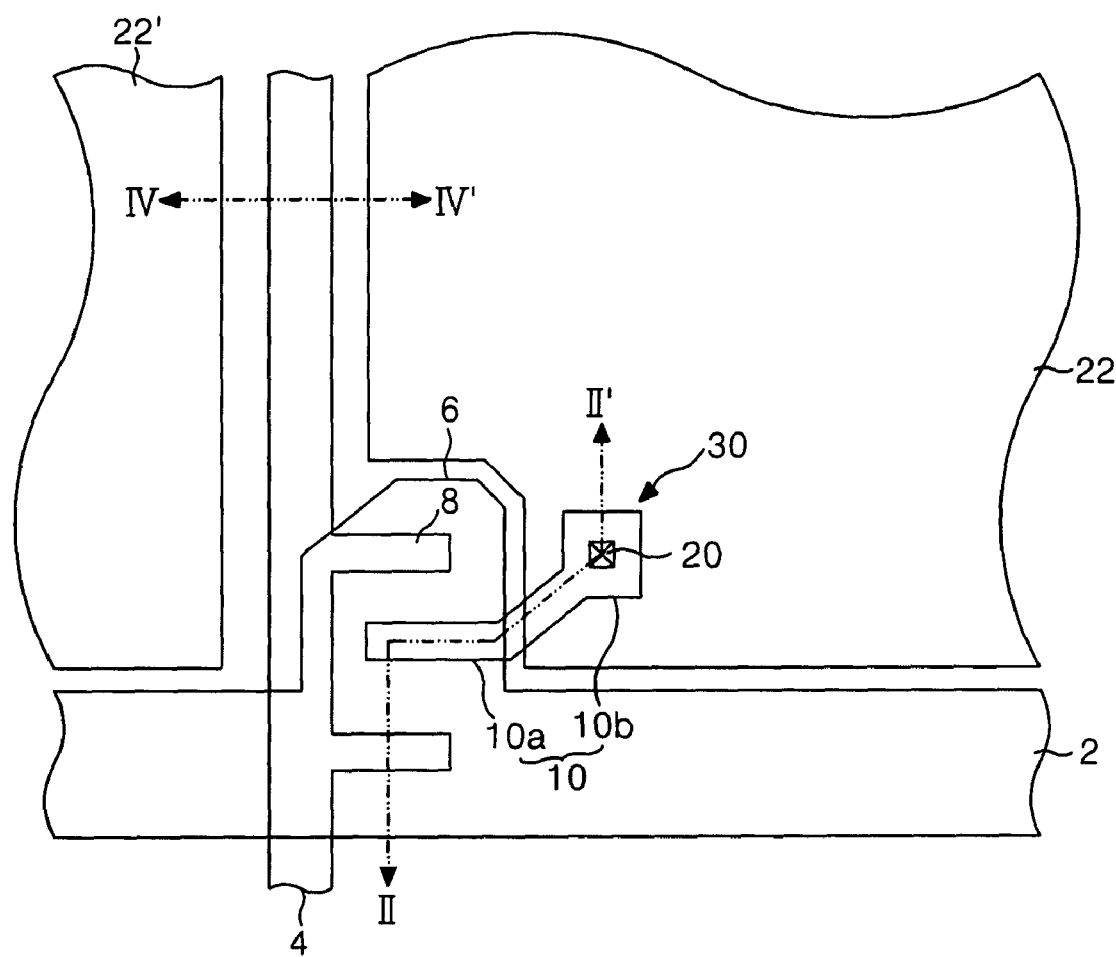
FIG. 1 is a plan view of a lower array substrate of a liquid crystal display according to the related art.
Figure 2:
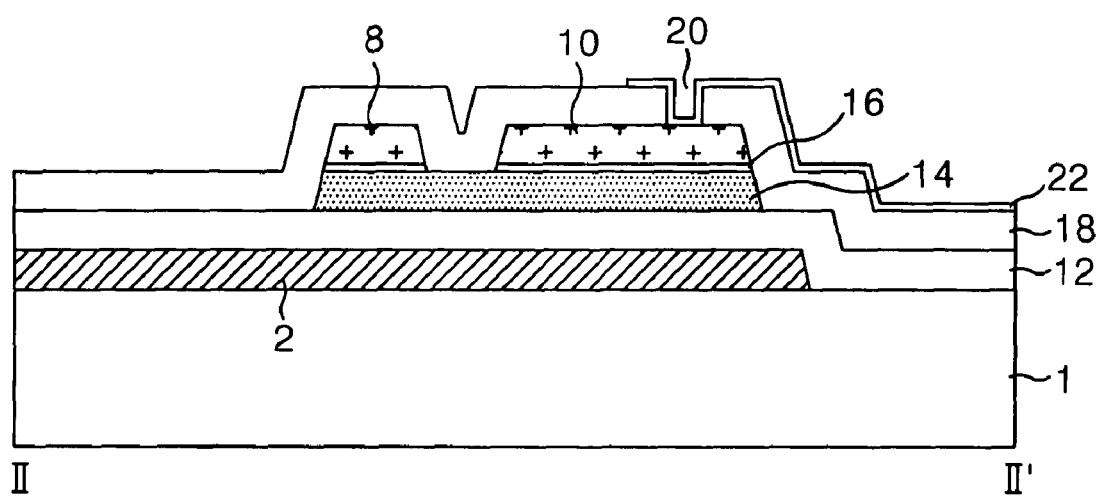
FIG. 2 is a cross sectional view along II–II' of FIG. 1 according to the related art.
Figure 3A:
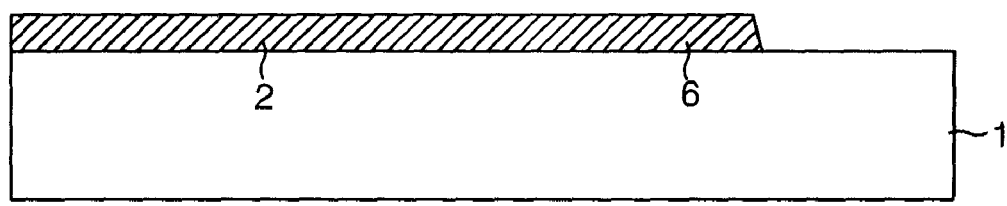
FIGS. 3A to 3D are cross sectional views of a method of fabricating the lower array substrate of FIG. 2.
Figure 3B:
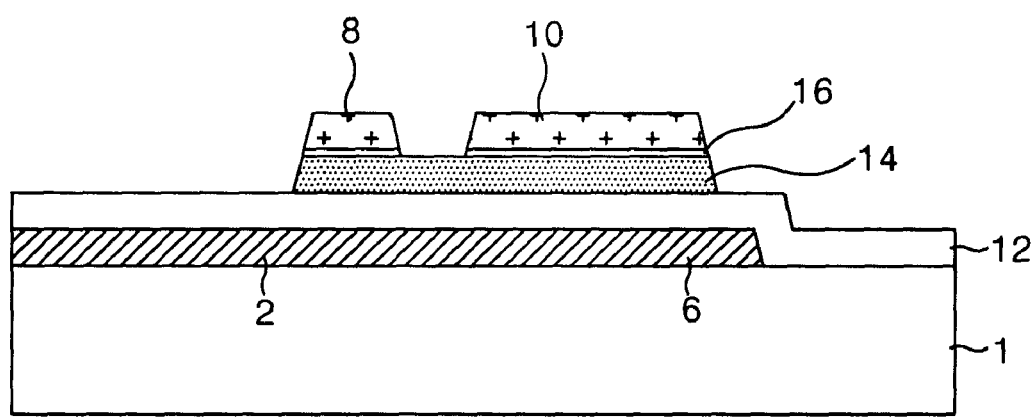
Figure 3C:
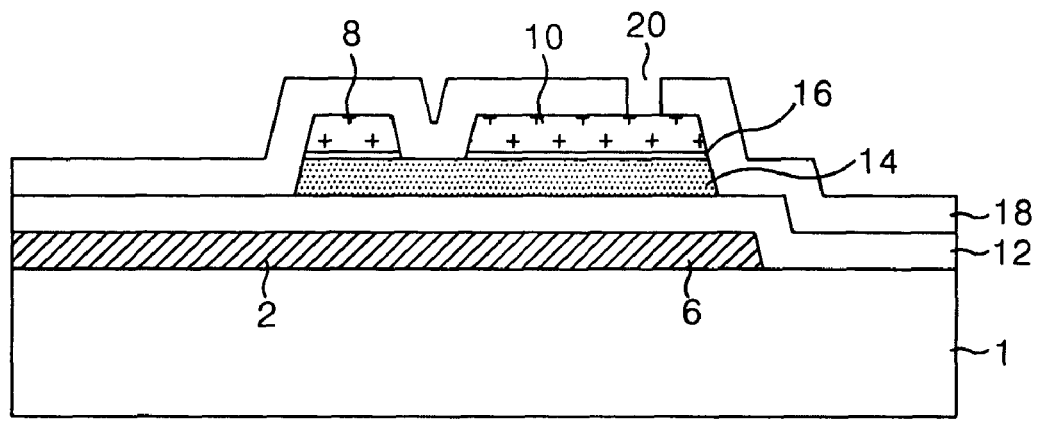
Figure 3D:
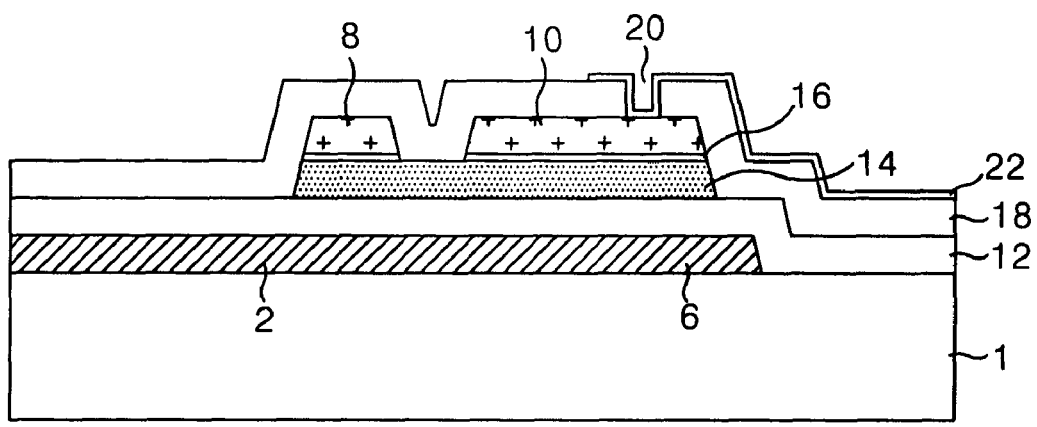
Figure 4A:
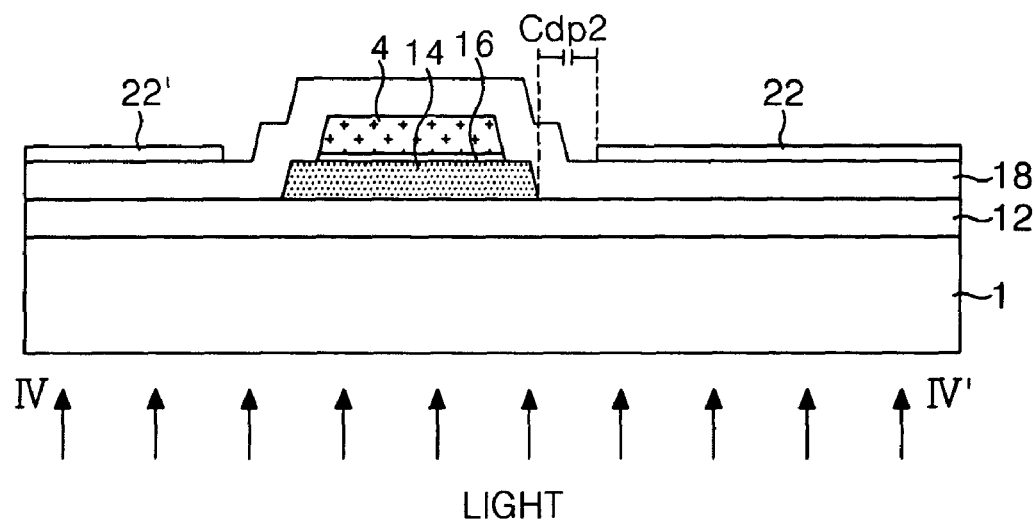
FIGS. 4A and 4B are cross sectional views along IV–IV' of FIG. 1 according to the related art.
Figure 4B:
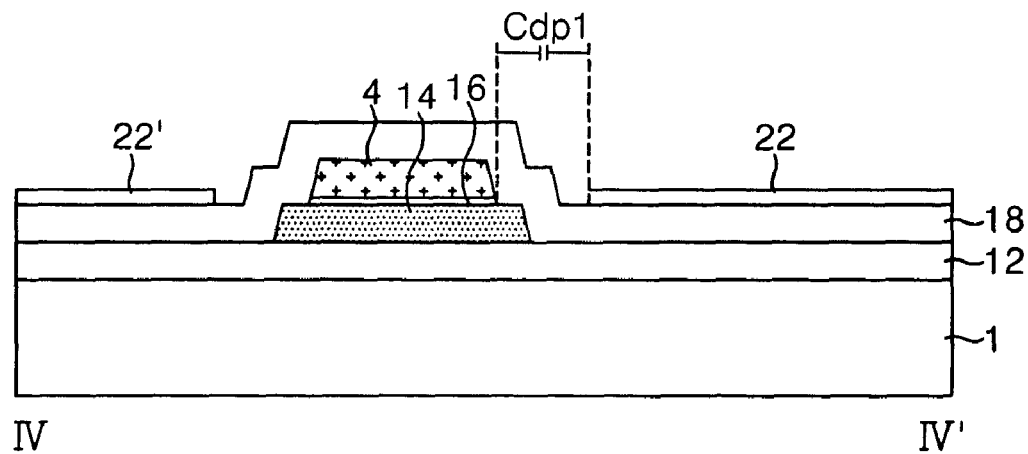
Figure 5:
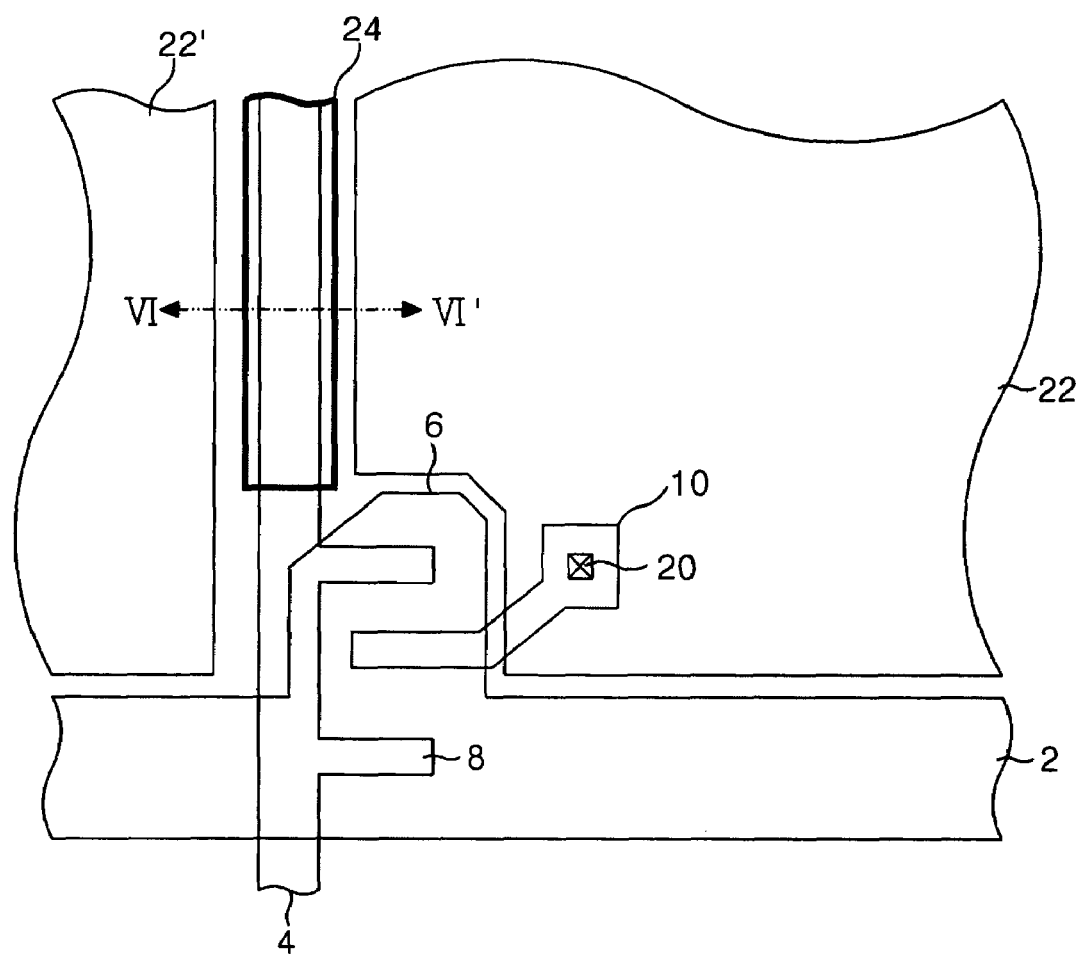
FIG. 5 is a plan view of a lower array substrate of a liquid crystal display panel according to the related art.
Figure 6:
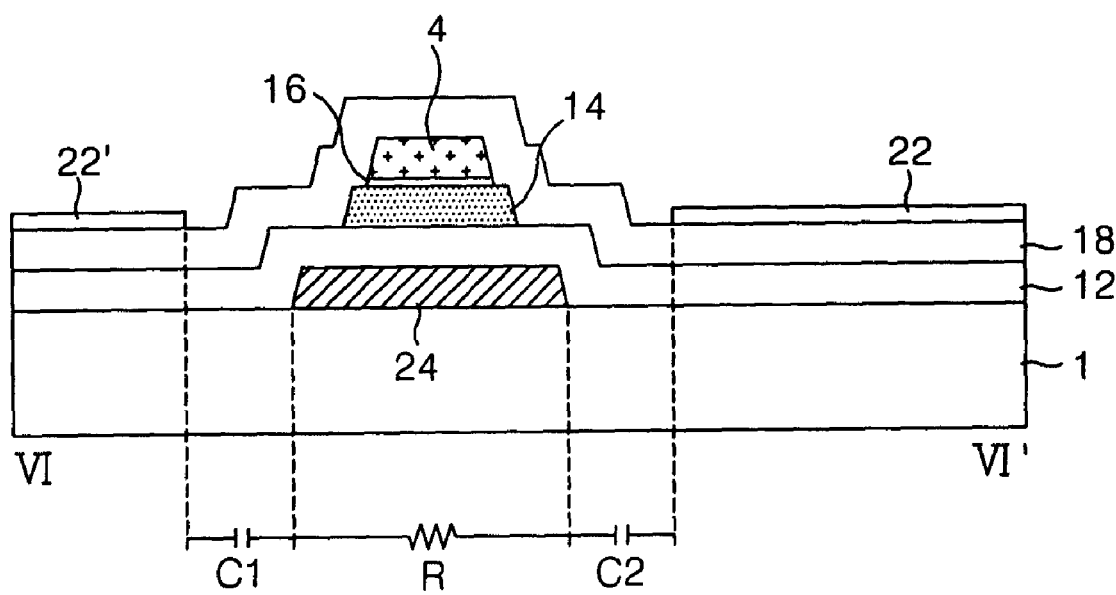
FIG. 6 is a cross sectional view along IV–IV' of FIG. 5 according to the related art.

FIGS. 11A to 11E are cross sectional views of an exemplary second mask process of FIG. 10B according to the present invention. In FIG. 1A, a gate insulating film 42, first and second semiconductor layers 45 and 47, and a data metal layer 39 may be sequentially formed on a lower substrate 31. In addition, a photo resist 68 may be deposited on an entire surface of the lower substrate 31. Then, a second mask MS, which may include a halftone mask or a diffractive mask, may be aligned to the lower substrate 31. The second mask MS may include a partial transmission layer 64 formed at a partial exposure area S2 of a transparent mask substrate 70, and a shielding layer 62 formed at a shielding area S1. Accordingly, the second mask MS may be formed to expose the transparent mask substrate 70 at an entire exposure area S0.

Figure 11A:
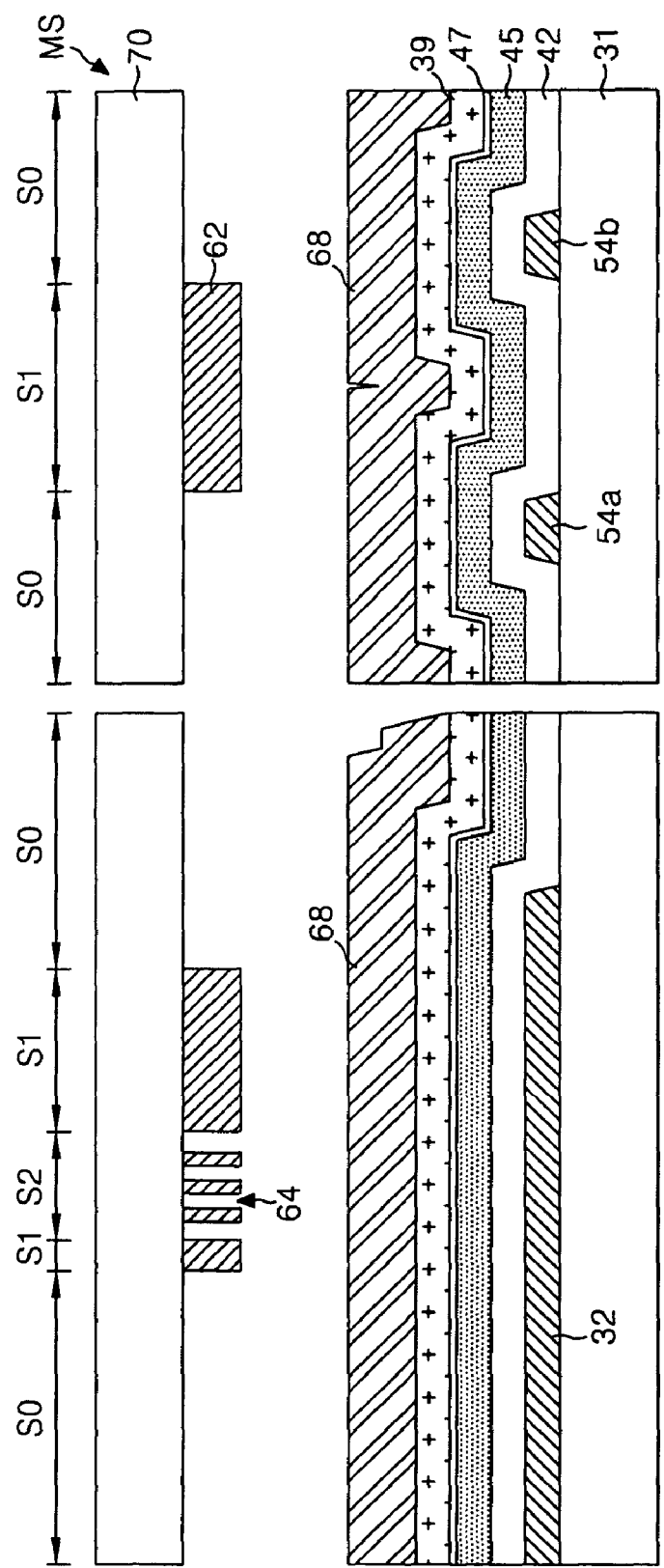
Figure 11B:
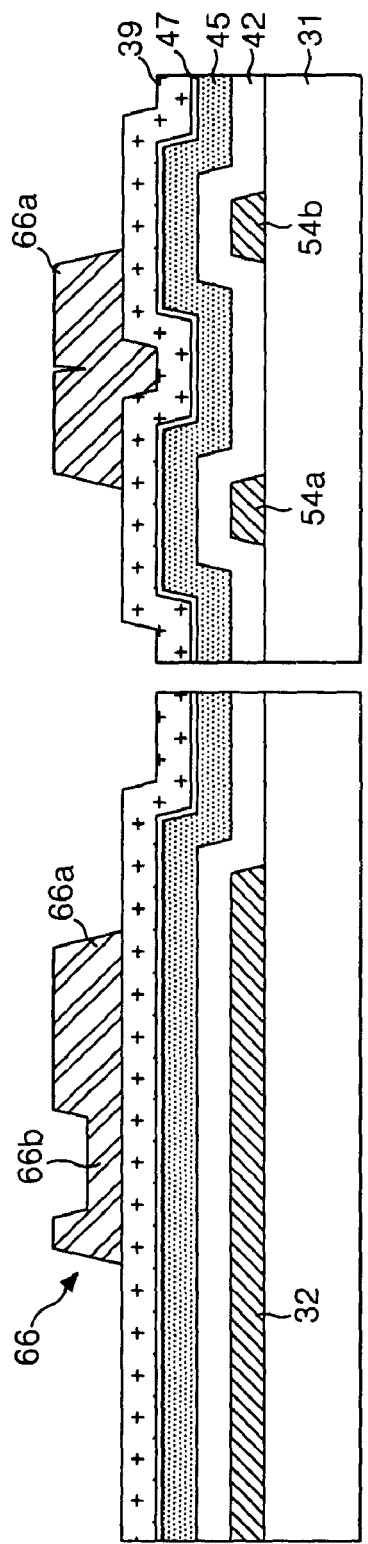

In FIG. 11B, by using photolithographic processes, the second mask MS causes the photo resist 68 fully exposed across the entire exposure area S0 of the second mask MS to be completely eliminated. In addition, a photo resist pattern 66 is formed by partially exposing or not exposing the photo resist 68 through the shielding area S1 and a partial exposure area S2 (in FIG. 11A). Accordingly, a first photo resist pattern 66A not exposed by the shielding layer 62 of the second mask MS in the photo resist pattern 66 may be formed have a first height, and a second photo resist pattern 66B partially exposed by the partial transmission layer 64 of the second mask MS may be formed to have a second height that is relatively lower than the first height.

Figure 11C:
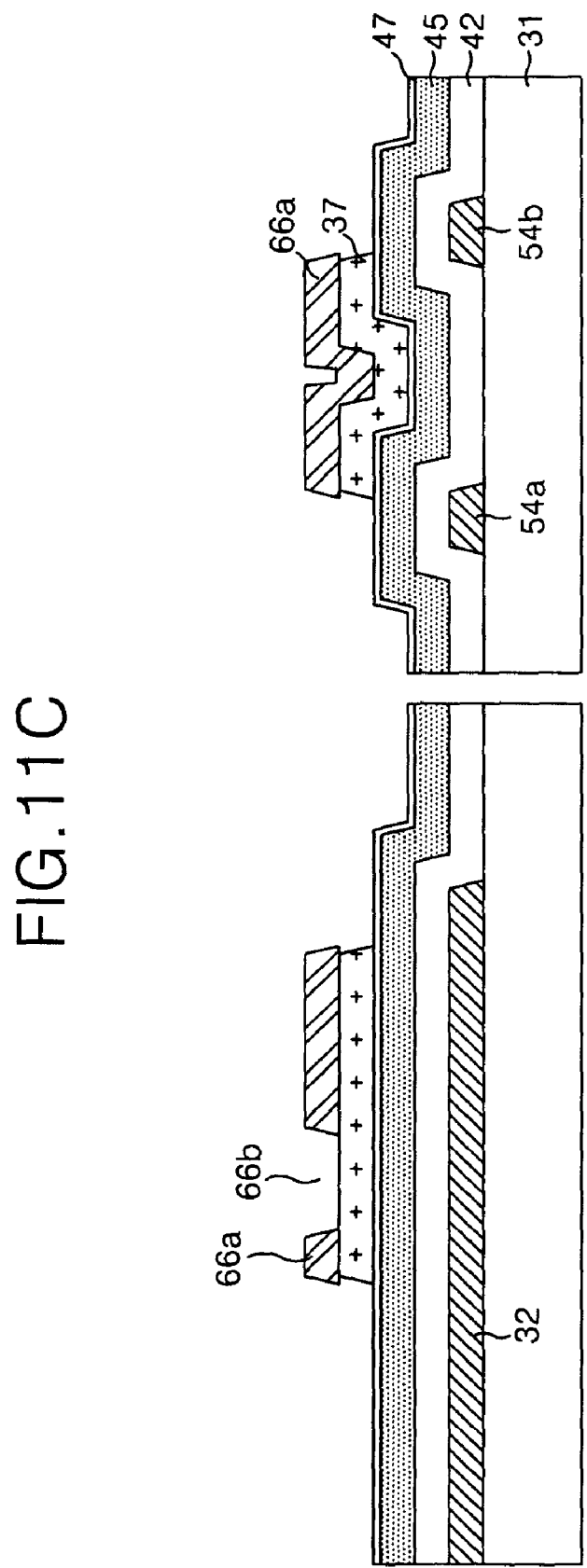

In FIG. 11C, the data metal layer 39 and the first and second semiconductor layers 45 and 47 may be simultaneously patterned using a dry etching process, wherein the photo resist pattern 66 may function as a mask. Accordingly, the active layer 44, the ohmic contact layer 46, and the data metal pattern 37 may be formed using the same mask. In the photo resist pattern 66, the second photo resist pattern 66b with the second height may be eliminated by an ashing process using a plasma, and the first photo resist pattern 66a may remain although reduced in height. In addition, the first photo resist pattern 66a may be provided to overhang sidewall portions of the data metal pattern 37. Thus, during subsequent etching processes, the sidewalls of the data metal pattern 37 and the first photo resist pattern 66a may be offset.

In FIG. 11D, the source electrode 38 and the drain electrode 40 may be separately formed by way of eliminating part of the data metal pattern 37 of a channel part of the TFT 60 (in FIG. 7) by an etching process using the photo resist pattern 66 with the second photo resist pattern 66b (in FIG. 11C) being removed. Accordingly, the ohmic contact layer 46 exposed by the source electrode 38 and the drain electrode 40, which are separated using the photo resist pattern 66, may be eliminated using a dry etching process, thereby exposing the active layer 44 to form a channel region.

In FIG. 11E, the first photo resist pattern 66a remaining on the data line 34 and the source and drain electrodes 38 and 40 may be eliminated using a strip process.

According to the present invention, the first and second light-shielding patterns 54a and 54b may be formed to partially overlap opposing edges of the data line 34 along a direction of the data line 34. The first and second light-shielding patterns 54a and 54b may be formed to cover the active layer 44, which may have a width larger than a width of the data line 34. Accordingly, optical pumping current generated by the light irradiated from the backlight may be restrained. Furthermore, a distance between the pixel electrode 52 and each of the first and second light-shielding patterns 54a and 54b may be greater than a distance between the first and second light-shielding patterns 54a and 54b, wherein the voltage charged in the first and second pixel electrodes 52 and 52' may be prevented from leaking.

It will be apparent to those skilled in the art that various modifications and variations can be made in the liquid crystal display panel and method of fabricating a liquid crystal display panel of the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a plurality of gate lines and data lines formed on a substrate;
   a plurality of pixel electrodes receiving data signals having different polarities from each other;
   a semiconductor layer formed along a direction of each of the data lines at a lower part of the data lines to extend past edge portions of the data lines; and
   a plurality of light-shielding patterns formed along the direction of the data lines to extend past the edge portions of the data lines.

2. A liquid crystal display panel, comprising:
   a plurality of gate lines and data lines formed on a substrate;
   a plurality of pixel electrodes receiving data signals having different polarities from each other;
   a semiconductor layer formed along a direction of each of the data lines at a lower part of the data lines; and
   a plurality of light-shielding patterns formed along the direction of the data lines,
   wherein each of the light-sheilding patterns overlap opposing edges of the data line and the semiconductor layer and width of the semiconductor layer is larger than a width of the data line.

3. The liquid crystal display panel according to claim 2, wherein the light-shielding patterns and the gate include the same materials.

4. The liquid crystal display panel according to claim 3, wherein the light-shielding patterns include at least one of aluminum, aluminum-neodymium, and copper.

5. The liquid crystal display panel according to claim 2, further comprising a protective film formed to cover the data line, and source and drain electrodes of a thin film transistor.

6. The liquid crystal display panel according to claim 5, wherein the protective film includes inorganic insulating material.

7. The liquid crystal display panel according to claim 6, wherein the light-shielding patterns are separated from the pixel electrode by about 1 $\mu$m, and a first one of the light-shielding patterns is separated from a second one of the light-shielding patterns by about 4 $\mu$m.

8. The liquid crystal display panel according to claim 5, wherein the protective film includes organic insulating material.

9. A method of fabricating a liquid crystal display panel, comprising the steps of:
   forming a gate electrode, a gate line, and individual first and second light-shielding patterns on a substrate;
   forming a gate insulating film on the substrate to cover the gate electrode, the gate line, and the individual first and second light-shielding patterns;
   forming a semiconductor layer on the gate insulating film to partially overlap the individual first and second light-shielding patterns;
   forming a data line on the gate insulating film to partially overlap the individual first and second light-shielding patterns and the semiconductor layer, a source electrode that is connected to the data line, and a drain electrode that faces the source electrode with the semiconductor layer therebetween;
   forming a protective film having a contact hole that exposes a portion of the drain electrode; and
   forming a plurality of pixel electrodes on the protective film,
   wherein adjacent ones of the pixel electrodes receive pixel voltages having different polarities.

10. The method according to claim 9, wherein the protective film includes inorganic insulating material.

11. The method according to claim 10, wherein the light-shielding patterns are separated from the pixel electrodes by about 1 $\mu$m, and a first one of the light-shielding patterns is separated from a second one of the light-shielding patterns by about 4 $\mu$m.

12. The method according to claim 9, wherein the protective film includes organic insulating material.

13. The method according to claim 9, wherein the first and second light-shielding patterns include at least one of aluminum, aluminum-neodymium, and copper.

14. A method of fabricating a liquid crystal display panel, comprising the steps of:
   forming a gate electrode, a gate line, and individual first and second light-shielding patterns on a substrate;
   forming a gate insulating film on the substrate to cover the gate electrode, the gate line, and the individual first and second light-shielding patterns;
   forming a semiconductor layer on the gate insulating film to partially overlap the individual first and second light-shielding patterns;
   forming a data line on the gate insulating film to partially overlap the individual first and second light-shielding patterns and the semiconductor layer;
   forming a protective film on the data line; and
   forming a plurality of pixel electrodes on the protective film.

* * * * *